US011112389B1

(12) United States Patent
Robinson et al.

(10) Patent No.: US 11,112,389 B1
(45) Date of Patent: Sep. 7, 2021

(54) ROOM ACOUSTIC CHARACTERIZATION USING SENSORS

(71) Applicant: Facebook Technologies, LLC, Menlo Park, CA (US)

(72) Inventors: Philip Robinson, Seattle, WA (US); Sebastià Vicenç Amengual Gari, Seattle, WA (US); Peter Henry Maresh, Seattle, WA (US); Carl Schissler, Redmond, WA (US); Andrew Lovitt, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 276 days.

(21) Appl. No.: 16/279,795

(22) Filed: Feb. 19, 2019

Related U.S. Application Data

(63) Continuation-in-part of application No. 16/262,632, filed on Jan. 30, 2019, now abandoned.

(51) Int. Cl.
*G01N 29/44* (2006.01)
*G06T 7/593* (2017.01)
*G01N 29/14* (2006.01)
*G01N 29/06* (2006.01)
*G06T 7/90* (2017.01)

(52) U.S. Cl.
CPC ....... *G01N 29/4472* (2013.01); *G01N 29/069* (2013.01); *G01N 29/14* (2013.01); *G06T 7/593* (2017.01); *G06T 7/90* (2017.01)

(58) Field of Classification Search
CPC ..... H04S 3/008; H04S 7/306; A61N 1/36036; G01N 29/4472; G01N 29/069; G01N 29/14; G06T 7/90; G06T 7/593
See application file for complete search history.

(56) References Cited

U.S. PATENT DOCUMENTS

| 2016/0266865 | A1* | 9/2016 | Tsingos | H04S 7/306 |
| 2017/0303053 | A1* | 10/2017 | Falch | A61N 1/36036 |
| 2019/0116448 | A1* | 4/2019 | Schmidt | H04S 3/008 |

OTHER PUBLICATIONS

Brandenburg, K., et al. "Plausible Augmentation of Auditory Scenes Using Dynamic Binaural Synthesis for Personalized Auditory Realities." Audio Engineering Society Conference, 2018, pp. 1-10.
(Continued)

*Primary Examiner* — Regis J Betsch
*Assistant Examiner* — Kaleria Knox
(74) *Attorney, Agent, or Firm* — Fenwick & West LLP

(57) ABSTRACT

A headset generates an output audio signal to provide a virtual sound source for an object or virtual object by using a room impulse response generated by a simulation using a model of a room generated from image data. The headset may include processing circuitry that obtains the model of the room determined based on the image data. The image data includes depth image data from a depth camera assembly and color image data from a color camera. The model includes surfaces of the room and acoustic absorptions of the surfaces. The processing circuitry adjusts audio content presented by the headset based on a room impulse response determined based on one or more simulations of sound propagation between a target position of an object and a position of the headset within the room using the surfaces of the room and the acoustic absorptions of the surfaces.

12 Claims, 9 Drawing Sheets

(56) References Cited

OTHER PUBLICATIONS

Plinge, A., et al. "Six-Degrees-of-Freedom Binaural Audio Reproduction of First-Order Ambisonics with Distance Information," Audio Engineering Society Conference, 2018, pp. 1-10.

Traer, J. et al., "Statistics of natural reverberation enable perceptual separation of sound and space," Proceedings of the National Academy of Sciences, 2016, vol. 113, No. 48, pp. E7856-E7865.

* cited by examiner

ROOM ACOUSTIC CHARACTERIZATION
USING SENSORS

CROSS REFERENCE TO RELATED
APPLICATION

This application is a continuation-in-part of U.S. patent application Ser. No. 16/262,632, filed Jan. 30, 2019, which is incorporated by reference in its entirety.

BACKGROUND

This disclosure relates to determining room acoustic parameters (e.g., a room impulse response), and specifically relates to determining room acoustic parameters using image data or other sensor data captured by a headset.

A sound perceived at the ears of two users can be different, depending on a direction and a location of a sound source with respect to each user as well as on the surroundings of a room in which the sound is perceived. Humans can determine a location of the sound source by comparing the sound perceived at each ear. In an artificial reality environment, simulating sound propagation from an object to a listener may use knowledge about the acoustic parameters of the room, for example a reverberation time or the direction of incidence of the strongest early reflections. One technique for determining the acoustic parameters of a room includes placing a loudspeaker in a desired source location, playing a controlled test signal, and de-convolving the test signal from what is recorded at a listener location. However, such a technique generally requires a measurement laboratory or dedicated equipment in-situ.

SUMMARY

Embodiments related to using image data of a room to generate a model of the room, and determining a room impulse response for the room based a performing a simulation of sound propagation using the model. The model of the room may define a geometry of the room including surfaces and acoustic absorptions of the surfaces. In the context of an artificial reality environment, the room impulse response can be used to generate an output audio signal that simulates sound propagation within the room from a target position of an (e.g., virtual) object to a position of a headset worn by a user. Other sensor data, such as audio data, may be used to refine the simulated room impulse response, or to iteratively improve the model of the room or the simulation of sound propagation.

Some embodiments include a method performed by a processing circuitry of a headset. The method includes: obtaining a model of a room determined based on image data including depth image data from a depth camera assembly and color image data from a color camera, the model including surfaces of the room and acoustic absorptions of the surfaces; and adjusting audio content presented by the headset based on a room impulse response. The room impulse response is determined based on one or more simulations of sound propagation between a target position of an object and a position of the headset within the room using the surfaces of the room and the acoustic absorptions of the surfaces.

Some embodiments include a headset including processing circuitry. The processing circuitry obtains a model of a room determined based on image data including depth image data from a depth camera assembly and color image data from a color camera. The model includes surfaces of the room and acoustic absorptions of the surfaces. The processing circuitry further adjusts audio content presented by the headset based on a room impulse response. The room impulse response is determined based on one or more simulations of sound propagation between a target position of an object and a position of the headset within the room using the surfaces of the room and the acoustic absorptions of the surfaces.

Some embodiments include a system including a headset and a server. The headset includes processing circuitry configured to: obtain a model of a room determined based on image data including depth image data from a depth camera assembly and color image data from a color camera, the model including surfaces of the room and acoustic absorptions of the surfaces; and adjust audio content presented by the headset based on the room impulse response. The room impulse response is determined based on one or more simulations of sound propagation between a target position of an object and a position of the headset within the room using the surfaces of the room and the acoustic absorptions of the surfaces. The server is configured to: receive the image data from the headset; update the model based on the image data; and provide the model to the headset.

Figure 1:
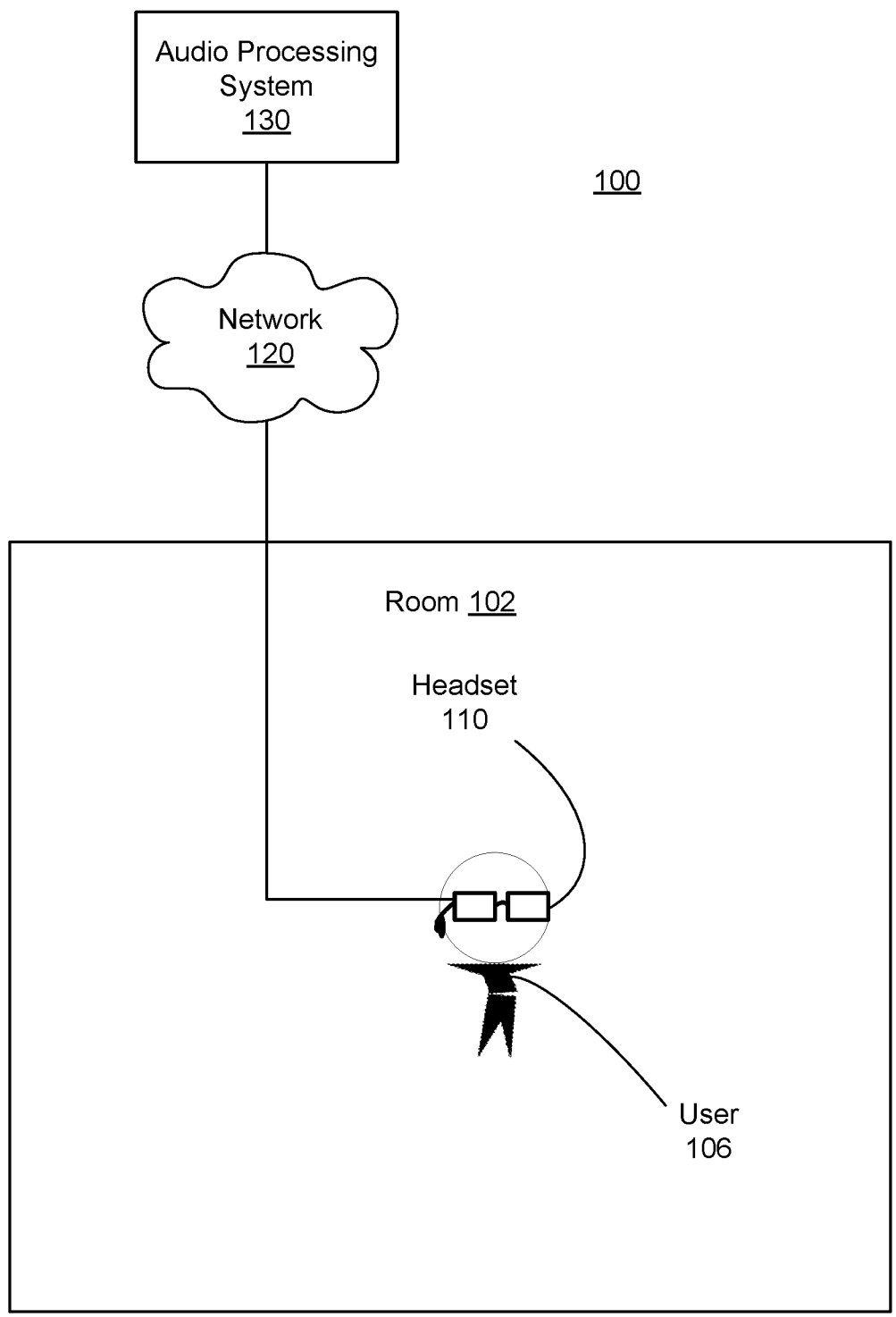
FIG. 1 is a block diagram of a system environment for a headset, according to some embodiments.

The figures depict various embodiments of the present disclosure for purposes of illustration only. One skilled in the art will readily recognize from the following discussion that alternative embodiments of the structures and methods illustrated herein may be employed without departing from the principles, or benefits touted, of the disclosure described herein.

DETAILED DESCRIPTION

Configuration Overview

Image data of a room is used to update a model of the room, and acoustic parameters for the room (e.g., room impulse response, reverberation time, direct to reverberant ratio, etc.) are determined based on a simulation of sound propagation using the model of the room. The acoustic parameters are used to transform a source audio signal associated with an (e.g., actual or virtual) object to simulate propagation of sound from a location of the (e.g., virtual sound source) object to a position of a listener within the room. Other sensor data, such as audio captured by an acoustic sensor, may be used to adjust the room impulse response or other acoustic parameters of the room. The fusion of data from various sensor sources is used determine a more accurate and complete understanding of the acoustic parameters of the room to provide production of more authentic virtual audio. In some embodiments, a headset is connected with a server via a network. Computationally expensive processing steps are performed by the server and time-sensitive processing steps resulting from user perceptual requirements are performed locally by the headset. For example, the direct sound and early reflection components of a room impulse response may be calculated by the headset, while the late reverberation component of the room impulse response may be calculated by the server provided to the headset.

Embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset connected to a host computer system, a standalone headset, a mobile device or computing system, or any other hardware platform capable of providing artificial reality content to one or more viewers.

Example System

FIG. 1 is a block diagram of a system 100 for a headset 110, according to some embodiments. The system 100 includes the headset 110 that can be worn by a user 106 in a room 102. The headset 110 is connected to an audio processing system 130 via a network 120.

The network 120 connects the headset 110 to the audio processing system 130. The network 120 may include any combination of local area and/or wide area networks using both wireless and/or wired communication systems. For example, the network 120 may include the Internet, as well as mobile telephone networks. In one embodiment, the network 120 uses standard communications technologies and/or protocols. Hence, the network 120 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The headset 110 presents media to a user. In one embodiment, the headset 110 may be a near-eye display (NED). In another embodiment, the headset 110 may be a head-mounted display (HMD). In general, the headset 110 may be worn on the face of a user such that content (e.g., media content) is presented using one or both lens 110 of the headset. However, the headset 100 may also be used such that media content is presented to a user in a different manner. Examples of media content presented by the headset 100 include one or more images, video, audio, or some combination thereof.

The headset 110 may provide for simultaneous localization for the position of the headset 110 within the room 102 and updating of a model of the room 102. For example, the headset 110 may include a depth camera assembly (DCA) that generates depth image data and a passive camera assembly (PCA) that generates color image data. The image data may be captured by the DCA and PCA while being worn by user, and used to generate the model of the room. Furthermore, the headset 110 may include position sensors or an inertial measurement unit (IMU) that tracks the position (e.g., including location and pose) of the headset 110 within the room. Additional details regarding the components of the headset 110 are discussed below in connection with FIGS. 6 and 7.

The audio processing system 130 facilitates the creation of audio output for the headset 110. For example, the audio processing system 130 receives a model of the room 102 from the headset 110, and determines a room impulse response or other acoustic parameters for the room 102 based on performing a simulation of sound propagation between a target position of a (e.g., virtual) object and a position of the headset 110 within the room 102. An output audio signal may be generated by modifying a source audio signal using the room impulse response to simulate propagation of sound within the room 102 from the source location to the position of the headset 110. The audio processing system 130 may provide the acoustic parameters to the headset 110 for generating the output audio signal at the headset 110, or may generate the output audio signal using the acoustic parameters and provide the output audio signal to headset 110 for rendering.

In some embodiments, the audio processing system 130 includes one or more servers and databases that are connected to the headset 110 via the network 120. In some embodiments, some or all of the components of the audio processing system 130 may be integrated with the headset 110, or another device (e.g., a console) connected to the headset 110.

Figure 2:
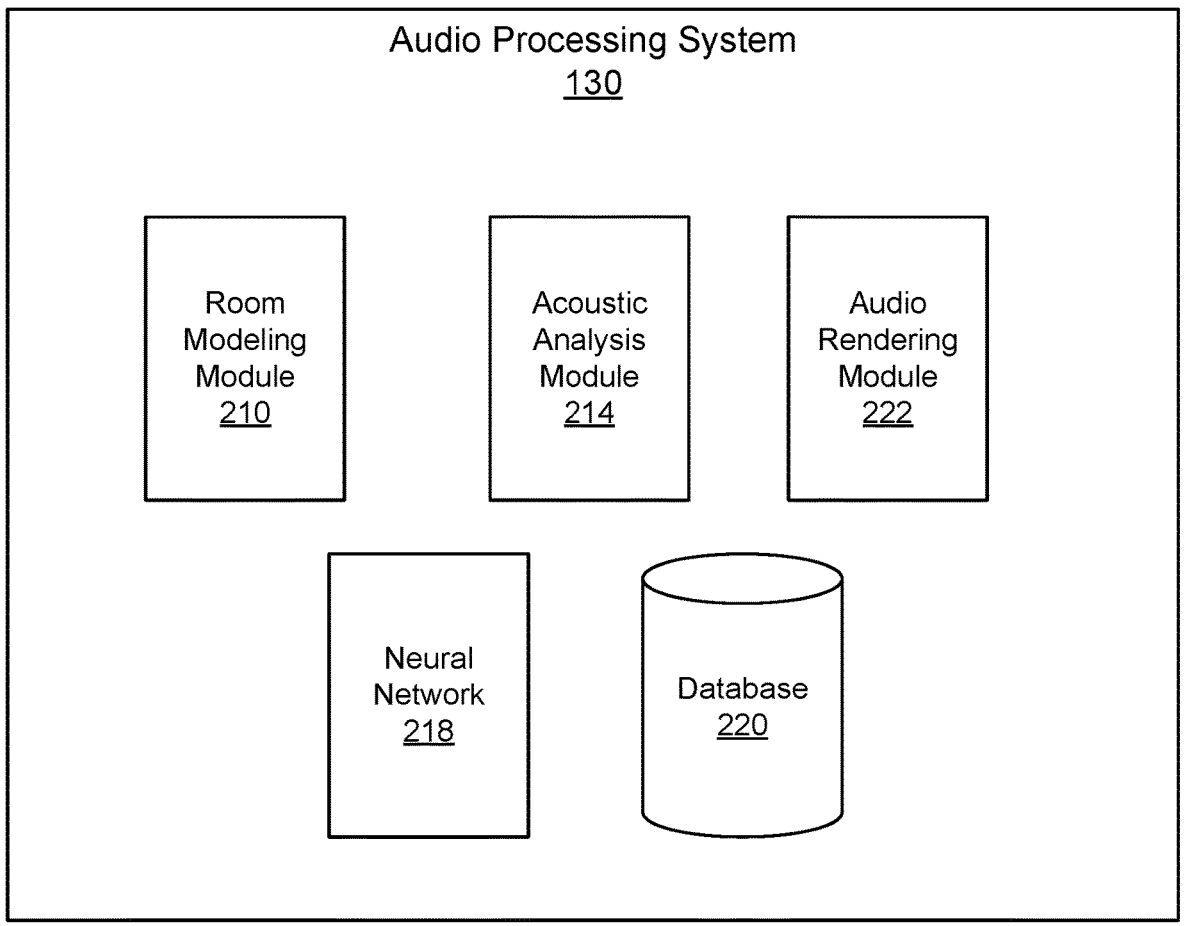
FIG. 2 is a block diagram of an audio processing system, according to some embodiments.

FIG. 2 is a block diagram of the audio processing system 130, according to some embodiments. The audio processing system 130 determines acoustic parameters for a room that can be used to transform an audio signal associated with an object or virtual object in the room. Some examples of acoustic parameters include the room impulse response of the room, the reverberation time of the room, and the direct to reverberant ratio of the room. To generate or update the acoustic parameters, the audio processing system 130 uses a model of the room including dimensions defined by surfaces and acoustic absorptions associated with the surfaces to perform a simulation of sound propagation between a position of the object and a position of the headset 110 within the room. The audio processing system 130 includes a room modeling module 210, an acoustic analysis module 214, one or more neural networks 218, a database 220, and an audio rendering module 222.

The room modeling module 210 generates and updates a model of the room based on image data. For example, the room modeling module 210 receives depth image data captured by the DCA of the headset 110, and uses the depth image data to determine the dimensions and geometry of the room in the model. The dimensions of the room may be defined by surfaces, such as surfaces of the walls, floor, and ceiling of the room. The dimensions and geometry of the room may also define a volume of the room, which can be used to determine acoustic parameters such as the reverberation time. The room modeling module 210 receives color image data captured by the PCA, and uses the color image data to associate materials or their acoustic absorption with the surfaces of the room. In some embodiments, the model of the room may further include objects located in the room. The objects may also include surfaces with associated materials and acoustic absorptions.

To generate the model of the room, the room modeling module 210 may generate a depth map using the depth image data generated by the DCA. The depth map for a frame of depth image data may include depth values. The room modeling module 210 uses the color image data to locate the depth map in a model of the room, and combines depth maps from multiple depth image data frames into a single depth map for the model of the room. The model of the room may then be texturized using, e.g., the color image data from the PCA. In some embodiments, the model of the room may be used to render content for the headset 110 in connection with being used to determine acoustic parameters.

In some embodiments, the room modeling module 210 performs simultaneous localization for the position of the headset 110 and updating of the model of the room using the image data captured by the DCA and PCA of the headset 110. Additional details regarding creation of a model from image data and simultaneous localization and mapping, applicable in some embodiments, are discussed in U.S. patent application Ser. No. 16/054,598, titled "3-D Head Mounted Display Based Environmental Modeling System," filed Aug. 3, 2018, which is incorporated by reference in its entirety.

The acoustic analysis module 214 performs a simulation of sound propagation to generate the room impulse response or other acoustic parameters of the room based on the model of the room, the position of an object that is to be a virtual sound source, and the position of the headset 110. The simulation may include a ray tracing simulation for the sound, including direct sounds, early reflections, and late reverberations. The simulation includes adjusting for reflections of the sound off surfaces of the model of the room based on the acoustic absorptions of the surfaces. To add a convincing virtual sound source to the object, the output audio signal from the headset 110 should incorporate changes that would be caused propagation of actual sound from the position of the object to the position of the listener. The room impulse response defines a transformation to the source audio signal caused by the propagation of the sound, including propagation along a direct path and various reflection paths off surfaces of the room. In some embodiments, the room impulse response includes a direct sound component, an early reflection component, and a late reverberation component. The propagation path from a source to a listener within an environment can be divided to three parts: direct sound path, early reflections, and late reverberation. Direct sound refers to sound paths without any reflection at a surface, early reflections refers to sound paths that that arrive at the listener within a predefined time (e.g., 50 to 80 milliseconds, depending on the room), and late reverberation refers to sound paths that arrive at the listener after the early reflections. The direct sound component of the room impulse response refers to a transfer function for a source audio signal that represents sound propagation along the direct sound path, the early reflection component of the room impulse response refers to a transfer function for the source audio signal that that represents sound propagation along early reflection paths, and the late reverberation component of the room impulse response refers to a transfer function for the source audio signal that represents sound propagation along late reverberation paths. An example of a simulation is discussed below with reference to FIG. 3.

The audio rendering module 222 generates an output audio signal for the headset 110 based on the room impulse response or other acoustic parameters to simulate propagation of sound. For example, audio rendering module 222 receives the room impulse response from the audio analysis module 214, and transforms the source audio signal of the object using the room impulse response. The audio rendering module 222 may further apply head-related transfer functions (HRTFs) to generate a left channel for a left speaker of the headset 110 and a right channel for a right speaker of the headset 110. In another example, other acoustic parameters determined from the model of the room such as the reverberation time or direct to reverberation ratio may be used to transform the source audio signal.

The neural network 218 facilitates the creation and updating of the model of the room based on determining acoustic absorption associated with surfaces of the model. The database 220 stores a trained neural network model defining neural network layers, layer connections, and kernels that provide algorithmic relationships between appearance of surfaces, defined by the image data received from the headset 110, and acoustic absorptions of the surfaces. In some embodiments, the neural network model is a convolution neural network model. Sound may attenuate differently when reflected by different types of materials, and thus the material in the room affects the room impulse response. Each material in the room has its own acoustic absorption, which can vary with acoustic frequency. Materials may have a distinct visual appearance, which is correlated with its acoustic absorption or other acoustic performance. For example, materials such as brick, glass, acoustic ceiling tile, etc. are visually distinctive and have different acoustic absorption. Using the neural network 218, (e.g., video) frames of color and depth image data may be analyzed to extract the acoustic properties based on their appearance, and assign these properties to the appropriate surface in the model of the room. The neural network 218 includes processing circuitry that implements the neural network model stored in the database 220. The neural network 218 may include a graphical processing unit (GPU) or an application-specific integrated circuit (ASIC) that is optimized to implement the neural network model.

The database 220 stores the neural network model used by the neural network 218, the model of the room updated by the acoustic analysis module 214. In some embodiments, the database 220 stores the reference audio signals. A reference audio signal may include a sample of audio used to generate sound, with the sound being picked up and deconvolved with the reference audio signal to generate measured room impulse responses. The audio processing system 130 may include one or more databases.

In some embodiments, the audio processing system 130 may use a measured room impulse or other measured acoustic parameters to adjust the acoustic parameters determined from the simulation. For example, an audio source at a source location within the room may generate sound using a reference audio signal stored in the database 220. The acoustic analysis module 214 receives the sound, and determines a measured room impulse response based on a transfer function between the sound and the source audio signal. The room impulse response determined by the simulation may be adjusted based on the measured room impulse response. In another example, a measured reverberation time or direct to reverberant ratio may be used to update the reverberation time or direct to reverberant ratio determined from the simulation.

In some embodiments, the measured acoustic parameters may be used to update the neural network model of the neural network 218. For example, the acoustic absorptions recognized by the neural network 218 and incorporated into the model affects the simulated room impulse response, and thus errors between the simulated room impulse response and the measured room impulse response may be used as training data to improve the neural network model. Differences between other types of measured and simulated acoustic parameters may also be used to update the neural network model.

The components of the audio processing system 130 may be on the same computing device, or in separate devices. In some embodiments, the room modeling module 210 and the audio rendering module 222 are located in the headset 110 or a console connected to the headset 110, while the acoustic analysis module 214 is located in a remote system. In other embodiments, each of the room modeling module 210, acoustic analysis module 214, and audio rendering module 222 are located in the headset 110.

In some embodiments, different components of a room impulse response may be determined by the headset 110 and a server. For example, the headset captures data of the room, such as image data or audio data, and provides the image data to the server. The server generates a model of the room based on the data from the headset 110 and provides the model to the headset 110. The headset performs a local simulation of sound propagation using the model of the room for the more time-sensitive components of the room impulse response in terms of perceptual requirements, such as a direct sound component and an early reflection component. The late reverberation component of the room impulse response is more computationally intensive, and thus offloaded to the server. The server determines the late reverberation component using a simulation of sound propagation based on the model, and provides the late reverberation component. The headset 110 may use the direct sound and early reflection components to adjust audio content. Once the late reverberation component is received, the headset 110 combines each of the direct sound, early reflection, and late reverberation components to generate a combined room impulse response, and uses the combined room impulse response to process further audio content.

Figure 3:
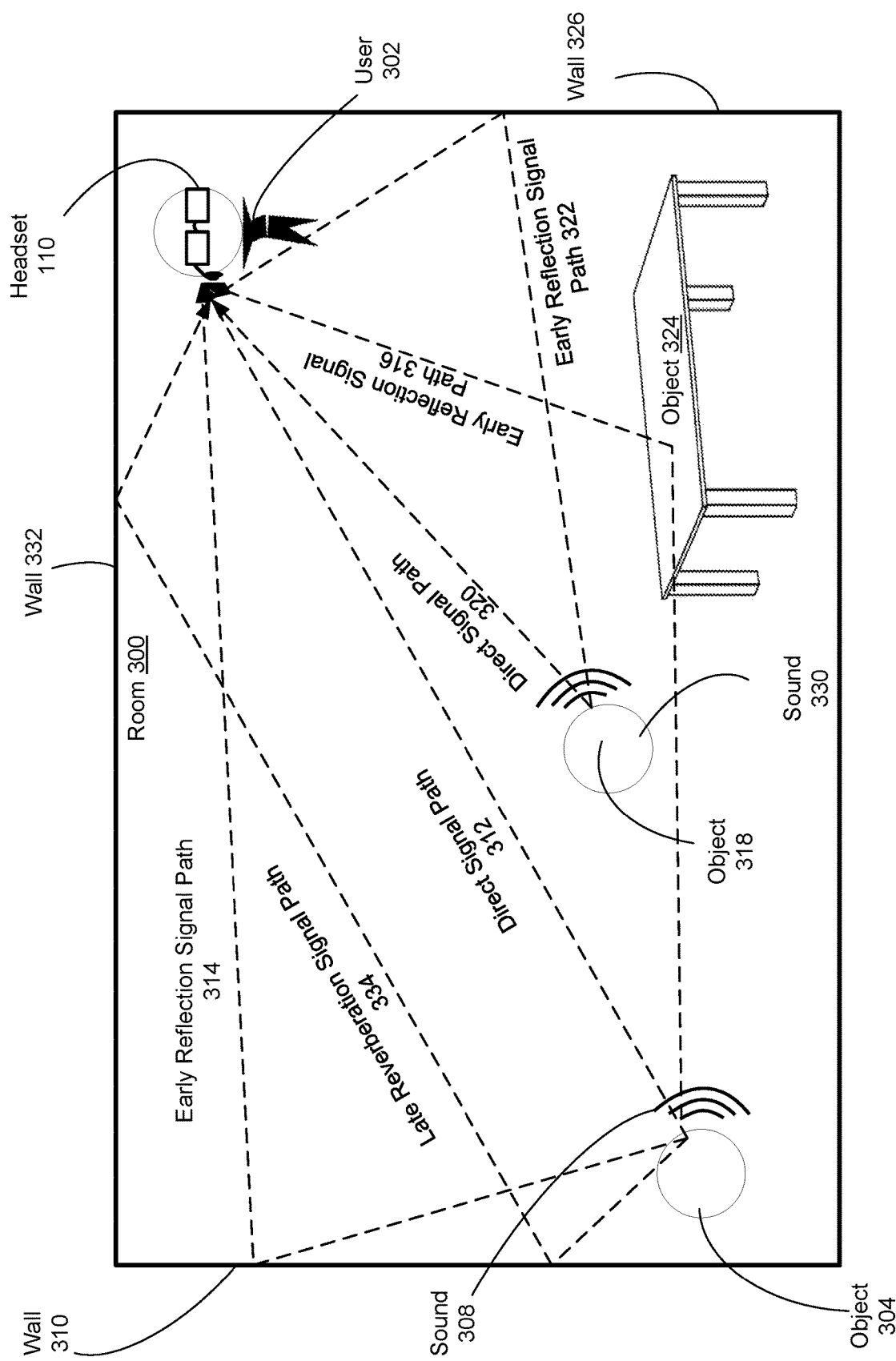
FIG. 3 illustrates a simulation of sound propagation between objects and a user within a room, according to some embodiments.

FIG. 3 illustrates a simulation of sound propagation between objects and a user within a model of a room, according to some embodiments. A room impulse response for a room represents how a sound is transformed when traveling in the room from a source to a receiver, and may include the effects of direct signal paths and reflection signal paths traversed by the sound.

A model of the room 300 includes surfaces such as the walls 310, 326, and 332, or the object 324. Each surface may be associated with an acoustic absorption. A ray tracing simulation may be used to model the propagation of sound 308 from the object 304 to the user 302. If the object 304 emits sound 308, the sound 308 travels to the headset 110 through multiple paths. Some of the sound 308 travels along a direct signal path 312 to the user 302 without reflection. The direct signal path 312 may result in an attenuation, frequency filtering, and time delay of the sound caused by the propagation medium (e.g., air) for the distance between the object 304 and the user 302. The simulation may further include higher order reflections off surfaces of the model of the room 300, such as early reflections and late reverberations. These portions of the sound are reflected, and represent reflection sounds. For example, another portion of the sound 308 travels along an early reflection signal path 314, where the sound is reflected by the wall 310 to the user 302. The early reflection signal path 314 may result in an attenuation, frequency filtering, and time delay of the sound 308 caused by the propagation medium for the distance between the object 304 and the wall 310, another attenuation or frequency filtering caused by a reflection off the wall 310, and another attenuation, frequency filtering, and time delay caused by the propagation medium for the distance between the wall 310 and the user 302. The amount of the attenuation at the wall 310 depends on the acoustic absorption of the wall 310, which can vary based on the material of the wall 310.

In another example, another portion of the sound 308 travels along an early reflection signal path 316, where it is reflected by a surface of an object 324 and to the user 302. Although the paths 314 and 316 are examples of 1st order reflections caused by reflection at a single surface, a room impulse response may incorporate effects from higher order reflections at multiple surfaces or objects. For example, another portion of the sound 308 travels along a late reverberation signal path 334, where the sound is reflected by the wall 310 and wall 332 before arriving at the user 302. By convolving a source audio signal of the object 304 with the room impulse response, the output audio for the user 302 of the headset 110 simulates propagation of the audio signal as sound through the room 300 along the direct and reflection signal paths.

The simulation results in a room impulse response, which is then convolved with a source audio signal. Other acoustic parameters of the room 300 such as the reverberation time or direct to reverberation ratio may be determined based on the room impulse response, or otherwise calculated via simulation using the model of the room. The direct to reverberant ratio may be calculated by summing the energy in the impulse response in two bins. The direct sound bin starts with the arrival of the direct sound and is usually 3-5 ms in duration. The reverberation bin commences from the end of the direct sound to the end of the room impulse response. The energy ratio of these two bins is the direct to reverberant ratio, usually expressed in decibels. To determine the reverberation time, energy in the impulse response is reverse-integrated, such as by using a Schroeder integration. The result of this operation is an energy decay curve. The slope of this curve within a designated range (e.g., −5 db to −20 dB or −35 dB) determines the decay rate. The amount of time required, at that rate, for the sound energy to decay 60 dB, is known as the reverberation time. The reverberation time may be used as a parameter to add reverberation to the source audio. In some embodiments, acoustic parameters may be mapped to an orientation and organization of the room and environment.

The simulation is discussed above for sound propagation from the object 304 to a single location represented by the user 302 wearing the headset 110. This location may represent an average location between the left and right speakers of the headset 110. For stereoscopic sound output to left and right speakers, there are two receivers located at different spatial positions represented by the left and right speakers. In some embodiments, separate ray tracing simulations using the model of the room may be performed for each of the left and right speakers to generate a binaural room impulse response that is convolved with the source audio signal to generate output channels for each of the left and right speakers. The position of the left and right speakers may be determined by tracking the location and head pose of the user 302 wearing the headset 110.

In some embodiments, multiple sound sources within the actual room 300 may be used to generate measured room impulse responses for multiple locations within the room 300. For example, the object 318 may include a speaker that generates a sound 330 using a reference audio signal that is measured by a microphone at the headset 110. The headset 110 determines a measured room impulse response by deconvolving the received sound 330 with the reference audio signal. The received sound 330 represents the sound 330 after propagation within the room, such as along a direct signal path 320 and early reflection signal path 322 off the wall 326. Similarly, a sound source may be represented by the object 304 that generates the sound 308 which is captured by the microphone at the headset 110 and used to determine another measured room impulse response. In some embodiments, multiple measured room impulse responses may be combined to generate an overall measured room impulse response for the room. Measured room impulse responses may be used to improve the simulation that generates the room impulse response from the model of room, or the parameters of the model.

Figure 4:
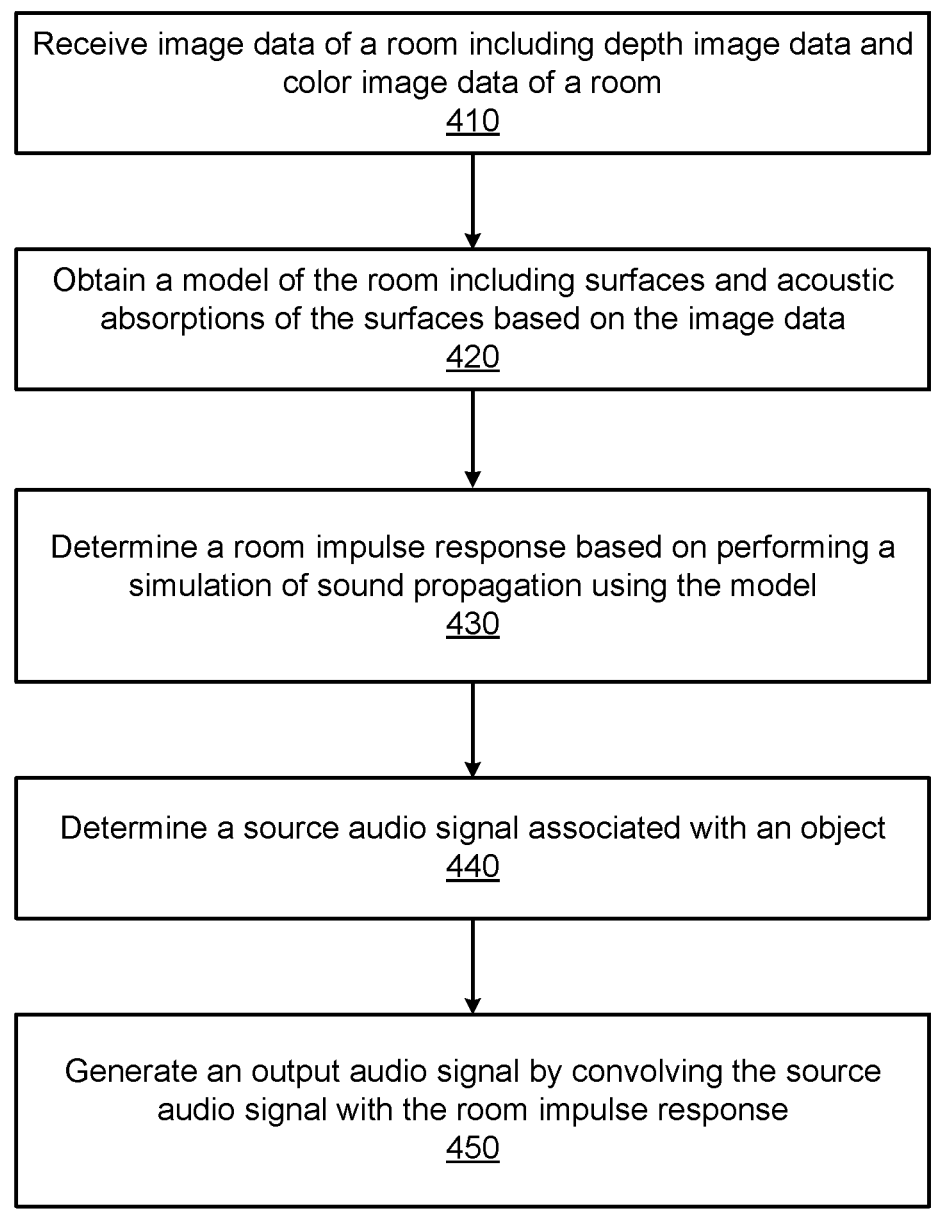
FIG. 4 is a flow chart of a method for generating an output audio signal using a room impulse response, according to some embodiments.

FIG. 4 is a flow chart of a method 400 for generating an output audio signal using a room impulse response, according to some embodiments. The method 400 may be performed by processing circuitry, such as the audio processing system 130. The headset 110 provides a virtual reality environment to the user including audio outputs of virtual sound sources associated with objects. An object may an actual object located in the room, or a virtual object presented by a display of the headset 110. The method 400 creates a virtual sound source that is perceived by the listener as propagating within the room from the source location of the object to the position of the user. The method 400 may include fewer or additional steps, and steps may be performed in different orders.

An audio processing system 130 (e.g., room modeling module 210) receives 410 image data of a room including depth image data and color image data. The image data may be captured by sensors on the headset 110 or otherwise located in the room. The depth image data may be captured by a depth camera assembly DCA and the color image data may be captured by a PCA.

The audio processing system 130 (e.g., room modeling module 210) obtains 420, a model of the room including dimensions defined by surfaces and acoustic absorptions of the surfaces based on the image data. The model may include one or more surfaces defining the geometry and dimensions of the room. The surfaces may include multiple side walls, a floor, and a ceiling for a rectangular shaped room. The model is not necessarily limited to a rectangular shaped room, and may include other shapes of rooms and corresponding surfaces. The surfaces of the room may define the dimensions and volume of the room. The model of the room may also include acoustic absorptions associated with the surfaces. For example, different surfaces of the room may include different materials with different acoustic absorptions. In some embodiments, the model of the room may further include objects, and acoustic absorptions associated with the surfaces of the objects.

In some embodiments, the headset captures the image data and provides the image data to a server separate from the headset. The server generates or updates the model of the room based on the image data, and the headset obtains the model from the server. In other embodiments, the headset obtains the model of the room by processing the image data.

The audio processing system 130 (e.g., acoustic analysis module 214) determines 430 a room impulse response based on performing a simulation of sound propagation using the model. The simulation may include modeling the propagation of sound as rays between a position of an object and a position of the headset 110 within the room using model. The position of the headset 110 may be tracked while the user moves within the room. The object may be a virtual object, or a virtual sound source for an actual object in the room. The simulation may include a ray tracing simulation that includes attenuating, frequency filtering, and time delaying direct sound from the object to the headset 110, and reflected sound by the surfaces of the room from the object to the headset 110. The ray tracing simulation may include emitting rays from the source. The rays intersect and reflect from surfaces, when they reflect, the acoustic absorptions of the surfaces are applied. For example, a sound that is reflected by a surface may be attenuated according to the acoustic absorption of the surface as defined by the model of the room. When a ray reaches the listener, its direction of arrival, arrival time, and frequency dependent amplitude are recorded. The sum of these arrivals of the rays is determined as the room impulse response. In some embodiments, determining the room impulse response includes determining a direct sound component, an early reflection component, and a late reverberation component. Each of these different components may be simulated using different ray paths between the object sound source and the receiver at the headset 110.

In some embodiments, a server separate from the headset determines the room impulse response by performing the simulation. The headset may provide the model to the server and receive the room impulse response from the server. In another example, if the server also updates the model using image data from the headset, the server may use the model to generate the room impulse response, and return the room impulse response to the headset. In other embodiments, the headset performs the simulation to generate the room impulse response.

In some embodiments, the audio processing system 130 determines other acoustic parameters of the room such as the reverberation time or direct to reverberant ratio based on the model of the room. The reverberation time for the room defines the time required for a sound decay within the room, such as the time required for sound decay by 60 dB. The reverberation time may be determined based on the volume of the room and the surface area weighted average of the acoustic absorptions of the room. The direct to reverberant ratio defines an energy ratio between direct sound and reflected sound components from propagation within the room. These acoustic parameters may be derived from the room impulse response, or otherwise by performing acoustic simulations using the model of the room.

The audio processing system 130 (e.g., audio rendering module 222) determines 440 a source audio signal associated with the object. The source audio signal represents the audio signal at the object prior to propagation as sound within the room. The object may be an actual object located in the room, or a virtual object. In an example of an augmented reality environment, the virtual object may be presented on a lens of the headset 110 as an overlay to the room visible through the lens. In another example, a virtual sound source that outputs the source audio signal may be associated with an actual object located in the room.

The audio processing system 130 (e.g., (e.g., audio rendering module 222) generates 450 an output audio signal by convolving the source audio signal with the room impulse response. In some embodiments, generating the output audio signal includes applying head-related transfer functions (HRTFs) to a mono source audio signal to generate left and right channels. For example, the mono source audio signal may be convolved with a binaural room impulse response to generate the left and right channels. For the room impulse response from the simulation as described above, each ray arrival, with its direction of arrival, timing and amplitude is replaced with a two-channel HRTF from that direction, with that amplitude, at that time. The left output channel may be provided to the left speaker and the right output channel may be provided to the right speaker of the headset 110. As such, audio content presented by a headset 110 is processed based on the determined room impulse response.

In some embodiments, the audio processing system 130 generates the output audio signal by transforming the source audio signal using other acoustic parameters, such as by applying the reverberation time or the direct to reverberation ratio to the source audio signal.

As discussed above in connection with FIG. 2, different components of the audio processing system 130 may perform different steps of the method 400, and these components may be located in different locations or devices. More computationally intensive processes may be performed by processing circuitry remote from the headset 110, such as in cloud computing system or other computing system. For example, the capturing of image data and updating of the model of the room may be performed by the headset 110, or a console connected to the headset 110 within the room. The simulation to generate the room impulse response may performed by the remote system connected to the headset 110 via the network 120. Offloading the simulation to the remote system can improve computational speed and reduce processing load at the headset 110. The headset 110 may receive the room impulse response or other acoustic parameters from the remote system in response to providing the model, and generate the output audio signal using the room impulse response or other acoustic parameters. In some embodiments, updating of the model may be performed by the remote system. Here, the headset 110 provides the captured image data or other sensor used to construct the model to the remote system.

Figure 5:
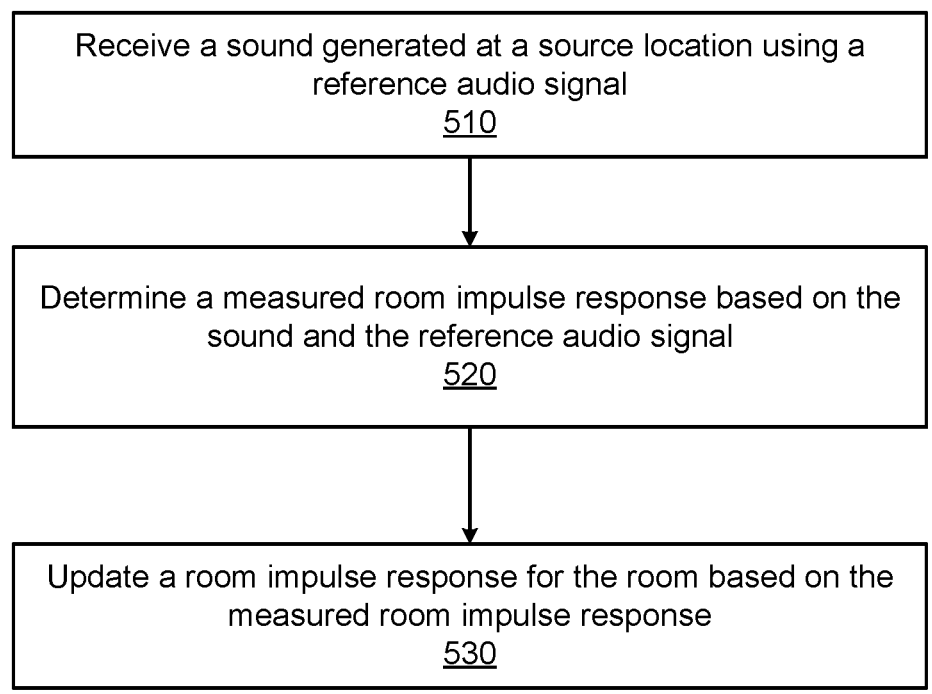
FIG. 5 is a flow chart of a method for updating a room impulse response based on a measured room impulse response, according to some embodiments.

FIG. 5 is a flow chart of a method for updating a room impulse response for a room based on a measured room impulse response, according to some embodiments. The method 500 may be performed by processing circuitry, such as the audio processing system 130. The method 500 may include fewer or additional steps, and steps may be performed in different orders.

The audio processing system 130 (e.g., acoustic analysis module 214) receives 510 a sound generated by an audio source using a reference audio signal. The audio source may be a speaker, another headset 110, or some other device located in the room at a location spaced apart from an acoustic sensor that captures the sound. In some embodiments, the sound may be ambient noise or other user-generated sound.

In some embodiments, a microphone or other type of acoustic sensor at the headset 110 receives the sound after propagation of the sound within the room from the audio source. In some embodiments, the headset 110 includes a microphone array that facilitates direction of arrival estimation for the sound. In some embodiments, both the audio source and the audio receiver are headsets 110 located in the room. In other embodiments, one or more of the audio source or audio receiver are dedicated audio equipment used to generate the measured room impulse response for the room.

The audio processing system 130 (e.g., acoustic analysis module 214) determines 520, a measured room impulse response based on the sound and the reference audio signal. The measured room impulse response defines a transfer function between an input audio signal generated from the received sound captured by a receiver and the reference audio signal. The transfer function may be determined based on deconvolving the input audio signal and the reference audio signal.

The audio processing system 130 (e.g., acoustic analysis module 214) updates 530, a room impulse response for the room, based on the measured room impulse response. In some embodiments, updating the room impulse response includes modifying the simulated room impulse response generated using the model of the room. For example, the sound source that emits the sound may be located at or near the position of the object of the simulation such that the measured room impulse response provides an expected result that can be used to improve the simulated room impulse response. In some embodiments, measured room impulse responses may be used to update the model of the room.

In some embodiments, the audio processing system 130 measures other acoustic parameters of the room, such as the reverberation time and direct to reverberant ratio. The audio processing system 130 may update these other acoustic parameters of the room based on the measured results. For example, a measured result can be used directly to parameterize the audio rendering algorithms, or to refine the acoustic absorptions of the neural network model or other material properties that were estimated using machine learning. A reverberation time may be measured by generating a sound source and measuring the time it takes for the sound to decay by specified amount (e.g., 60 dB) after the sound source is removed.

A direct to reverberant ratio may be measured using an omni-directional microphone or microphone array. For example, a user may be wearing the headset 110. The headset 110 beamforms on a source in the room. The beamformed signal removes a large amount of the reverberation from the signal and produces a clean signal of the acoustic object. The clean signal used to estimate the propagation parameters for the signal reaching each microphone including but not limited to delay, attenuation, filter response, etc. Later the same source produces a sound (could be the same or different sound) and the same process is repeated. This provides a set of parameters which characterize the source location to the headset 110 which can be used to estimate other acoustic parameters in the room. The relationship between the clean, beam derived signal and the signal captured by the omni-directional microphone may be used to determine the direct to reverberant ratio.

In some embodiments, a refinement process may be used to update the neural network model that includes performing an optimization that iteratively adjusts the machine learning model until a simulated acoustic parameter closely matches a measured acoustic parameter. For example, transfer functions between reference audio signals and measured sound generated from the reference audio signals may be used to determine an acoustic parameter, and the relationships between the acoustic absorptions and the appearances of surfaces of the neural network model may be updated based on the acoustic parameter.

In some embodiments, multiple room impulse responses or other acoustic parameters may be measured at different locations to determine an overall room impulse response or other acoustic parameters of the room. For example, audio sources may be at different locations in the room. A measured room impulse response may be determined for each of the audio source locations relative to a receiver position. An overall room impulse response for the room, or other overall acoustic parameters of the room, may be determined based on combining the results of the measured room impulse responses or other measured acoustic parameters at the different locations.

In some embodiments, acoustic properties associated with objects in the room may be determined based on measured acoustic parameters. For example, the measurement of acoustic parameters according to method 400 may be repeated with different objects in the room. The measured room impulse responses may then be correlated with the model of the room, which includes representations of the objects and their locations. The audio processing system 130 may determine based on the differences in the measured room impulse responses the acoustic properties of the objects, and the effect of the presence of the objects on the acoustic parameters of the room. The acoustic properties of the objects may be stored in the audio processing system 130 (e.g., database 220) or some other storage location for subsequent retrieval when a known object is detected in the room, and used to update the model of the room. In one example, an acoustic absorption of a surface of an object may be updated by retrieving previously stored acoustic properties of the object. In some embodiments, acoustic properties may be measured over time, and historical information regarding acoustic parameters may be stored and incorporated into the model.

Figure 6:
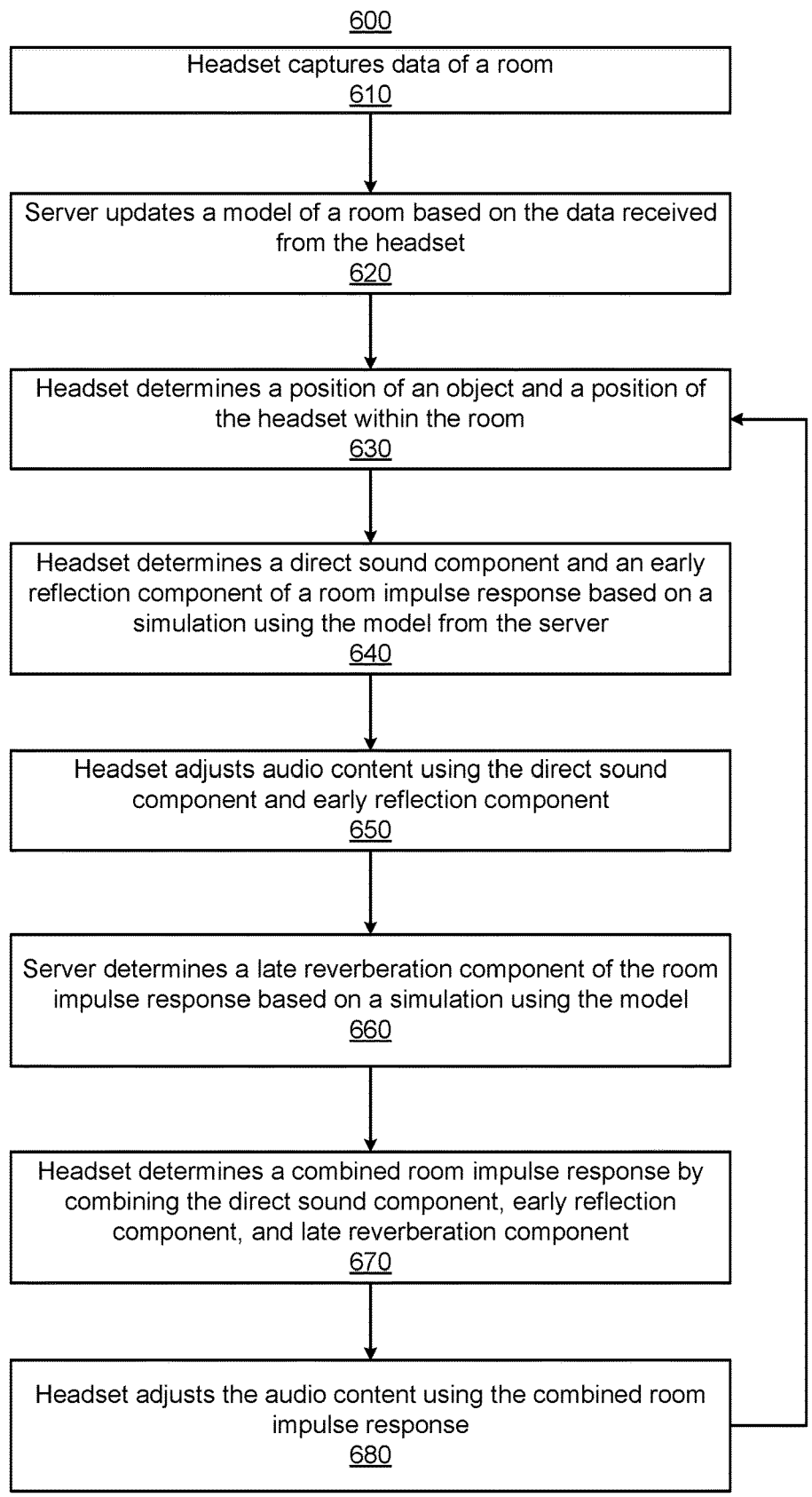
FIG. 6 is a flow chart of a method for generating an output audio signal using a room impulse response, according to some embodiments.

FIG. 6 is a flow chart of a method 600 for generating an output audio signal using a room impulse response, according to some embodiments. The method 600 may be performed by a headset 110 in connection with a remote server, with computationally expensive processing steps being performed by the server and time-sensitive processing steps resulting from user perceptual requirements being performed locally by the headset 110. For example, the direct sound and early reflection components of a room impulse response may be calculated by the headset 110, while the late reverberation component of the room impulse response may be calculated by the server provided to the headset 110. The server may be connected to the headset 110 via the network 120. The method 600 may include fewer or additional steps, and steps may be performed in different orders.

The headset 110 captures 610, data of a room. The data may include image data, such as depth image data and color image data. In some embodiments, the data further includes audio data of sound generated in the room. The audio data may include captured sounds, measured room impulse responses, or other measured acoustic parameters. In some embodiments, the data may be captured by a device separate from the headset 110, such as a capture device with sensors, another headset 110, a mobile device with image depth capabilities, a dedicated device, etc.

The server updates 620 a model of the room based on the data received from the headset 110. The headset 110 provides the data to the server, such as via the network 120. The model of the room may include dimensions defined by surfaces and acoustic absorptions of the surfaces. The server may provide the model of the room to the headset 110. In some embodiments, the model of the room includes acoustic material classifications associated with the surfaces of the room, which are associated with acoustic absorptions by the headset 110.

The headset 110 determines 630 a position of an object and a position of the headset 110 within the room. The object may be a virtual object or actual object in the room that serves as a virtual sound source. The position of the headset 110 may include a position for a left speaker and a position of a right speaker of the headset 110. The positions of the object or the headset 110 may be updated over time. For example, the object or user wearing the headset 110 may move within the room, and the movements may be tracked to determine the positions of the object and headset 110.

The headset 110 determines 640 a direct sound component and an early reflection component of a room impulse response based on performing a simulation of sound propagation from the position of the object to the position of the headset using the model from the server. For example, processing circuitry of the headset 110 performs a simulation using the model that calculates the direct sound and early reflection components of the room impulse response. The direct sound and early reflection components may collectively define an incomplete portion of the room impulse response because they do not include a late reverberation component. The direct sound and early reflection components represent the more time-sensitive components of the room impulse response in terms of perceptual requirements, and are also less computationally intensive relative to the late reverberation component. As such, the direct sound and early reflection components are calculated locally at the headset 110.

For the direct sound component, the simulation may include modeling the propagation of sound rays between the position of the object and one or more positions of the headset 110 without any reflections at the surfaces of the room. In some embodiments, a first direct sound component is generated for the left speaker of the headset 110 and a second direct sound component is generated for the right speaker of the headset 110. If the left and right speakers of the headset 110 located at the ears, then the sound from the object propagates differently to each of the speakers/ears in the simulation which is reflected in the first and second direct sound components. If the speakers are located away from the ears, transfer functions may be used to further adjust the direct sound components to result in the desired sound at each of the ears. Each direct sound component may be defined by an attenuation, frequency filter, and time delay.

For the early reflection component, the simulation may include modeling the propagation of sound rays from the position of the object, to one surface of the room where the sound is attenuated based on the acoustic absorption of the surface, and then to the position of the headset 110. In some embodiments, a first early reflection component is generated for the left speaker of the headset 110 and a second early reflection component is generated for the right speaker of the headset 110. If the left and right speakers of the headset 110 located at the ears, then the sound from the object propagates differently to each of the speakers/ears in the simulation which is reflected in the first and second early reflection components. If the speakers are located away from the ears, transfer functions may be used to further adjust the early reflection components to result in the desired sound at each of the ears. Each early reflection component may be defined by an attenuation, frequency filter, and time delay.

In some embodiments, the headset 110 generates the model of the room locally from the captured data, and uses the local model of the room to perform the simulation for the direct sound component and early reflection component of the room impulse response. The headset 110 may provide the model to the server. In some embodiments, the headset 110 receives the model of the room from the server and updates the model as needed based on data captured by the headset.

The headset 110 adjusts audio content presented by the headset based on the direct sound component and the early reflection component of the room impulse response. For example, the headset 110 convolves a first component of a source audio signal associated with the object with the direct sound component and the early reflection component of the room impulse response to generate an output audio signal. The output audio signal may include a left channel for the left speaker of the headset 110 and a right channel for the right speaker of the headset 110. Because of the time-sensitive nature of the direct sound and early reflection components in terms of perceptual requirements of the user, these components may be applied to the source audio signal after their determination, and without waiting for the more computationally expensive late reverberation component of the room impulse response to be available.

The server determines 660, a late reverberation component of the room impulse response, based on performing a simulation of sound propagation from the position of the object to the position of the headset using the model of the room. The headset 110 may provide the positions of the object and the headset 110 to the server to facilitate the simulation. For the late reverberation component, the simulation may include modeling the propagation of sound rays from the position of the object to the position of the headset 110, with intervening reflections at multiple surfaces of the room where the sound is attenuated based on the acoustic absorptions of the surfaces. In some embodiments, a first late reverberation component is generated for the left speaker of the headset 110 and a second late reverberation component is generated for the right speaker of the headset 110. If the left and right speakers of the headset 110 located at the ears, then the sound from the object propagates differently to each of the speakers/ears in the simulation which is reflected in the first and second late reverberation components. If the speakers are located away from the ears, transfer functions may be used to further adjust the late reverberation components to result in the desired sound at each of the ears. Each late reverberation component may be defined by an attenuation, frequency filter, and time delay. The server may determine the late reverberation component in parallel with the headset 110 determining or using the direct sound component and the early reflection component calculated locally at the headset 110.

In some embodiments, a room impulse response is a time series of (e.g., 100,000 or more) data points. A parametric encode may be used to reduce the time series into a few dozen parameters. For example, reverberation time per frequency, early reflection arrival time, direction, and strength, direct-to-reverberant ratio per frequency. This encoded RIR of only a few dozen parameters could then be transmitted efficiently over the network. On the mobile side, the parameters may be used to reconstruct the full room impulse response, which is then used to present the audio.

In some embodiments, the server determines a reverberation time using the audio data from the headset 110. For example, the reverberation time may be determined based on a measured reverberation time. The reverberation time may be used to determine the late reverberation component, or to update the late reverberation component determined through the simulation of sound propagation. In some embodiments, the reverberation time may be one of the parameters of an encoded room impulse response. It can be used to reconstruct a decoded room impulse response, or as a parameter of a reverberator which provides the late reverberation component of the room impulse response. The reverberation time may be determined by fitting a line to the energy decay of the room impulse response and reported as the amount of time a line with the same slope would span −60 dB.

The headset 110 determines 670 a combined room impulse response by combining the direct sound component, the early reflection component, and the late reverberation component. The server provides the late reverberation component to the headset 110, such as via the network 120. At this stage, each component of the room impulse response is available at the headset 110, and thus the headset 110 generates the combined room impulse response using each of the components. In a real-time, interactive system, the sound must be spatially updated with the movements of the user or object in order to maintain virtual sounds that are perceived as stable by the user wearing the headset 110. The latency tolerance for this spatial update should not exceed 100 ms, for example, based on the properties of the human auditory system. This is too short for round-trip communication to the server (e.g., a cloud based service), hence some of the computations are handled locally by the headset 110, while others (e.g., the late reverberation component) are offloaded to the server and then returned to the headset 110.

The headset 110 adjusts 680 the audio content presented by the headset 110 using the combined room impulse response. For example, the headset 110 convolves 680 a subsequent component of the source audio signal associated with the object with the combined room impulse response to provide the output audio signal. As such, source audio signals associated with the object may be initially adjusted using the direct sound and early reflection components of the room impulse response to satisfy perceptual requirements for the user. After the late reverberation component is received at the headset 110 from the server, the source audio signals associated with the object may be adjusted using the combined room impulse response instead of only the direct sound and early reflection components. The output audio signal, which may include left and right channels, are provided to left and right speakers of the headset 110.

The method 600 may be repeated, such as based on changes in the position of the user or object. For example, the method 600 may return to step 630, where headset 110 determines changes to the position of the headset 110 or the object within the room. Based on an updated position to the object or headset 110, the components of the room impulse response may be updated accordingly using simulations at the headset 110 and the server. Each of the different components of the room impulse response may include different perceptual requirements for spatial update rates. Listeners have very little tolerance for latency in the direct sound path, sound that travels directly from the source to the listener, and thus the method 600 provides for spatial updating using the direct sound component as quickly as possible. There may be more tolerance for latency in early reflections. In some embodiments, determination of the early reflection component may also be performed by the server. The late reverberation is least sensitive to changes in position of the headset 110 (e.g., caused by head rotation), because in many cases it is isotropic and uniform within a room, so it does not change at the ears with rotational or translational movements. The late reverberation component is also computationally expensive. As such, determination of the late reverberation component is offloaded to the server which may not have as stringent energy and computation limitations as the headset 110, but may have latency via the network 120. In some embodiments, the spatial update rate of direct sound is a maximum of 10 ms, meaning that from when a person moves until when the sound is presented in the new location is no more than 10 ms. Early reflections may include a spatial update rate of a maximum of 50 ms. Late reverberations may include a spatial update rate of greater than 150 ms.

Figure 7:
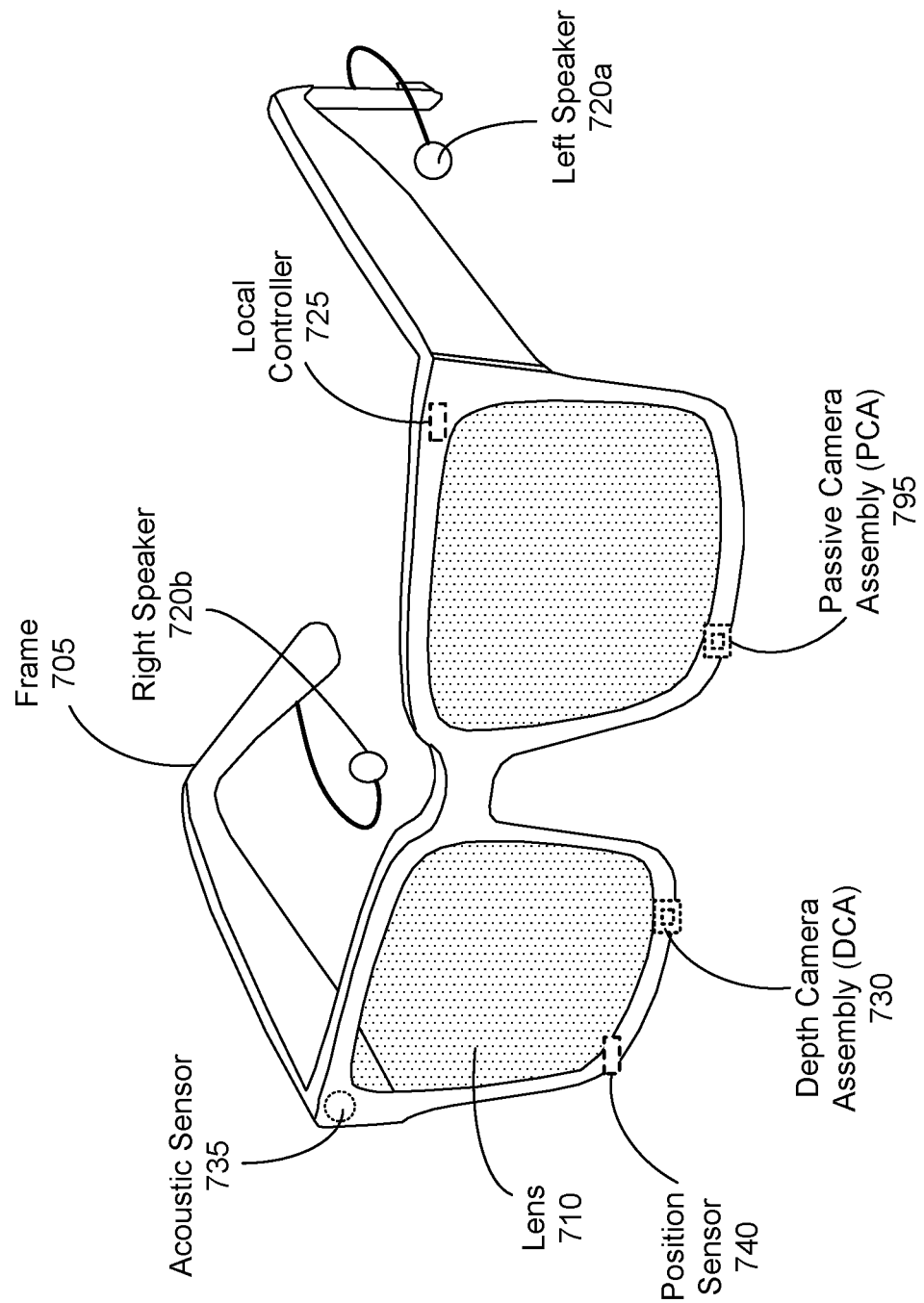
FIG. 7 is an example diagram of a headset, according to some embodiments.

FIG. 7 is an example diagram of the headset 110, according to some embodiments. The headset 110 presents media to a user. In one embodiment, the headset 110 may be a near-eye display (NED). In another embodiment, the headset 110 may be a head-mounted display (HMD). In general, the headset may be worn on the face of a user such that content (e.g., media content) is presented using one or both lens 710 of the headset 110. However, the headset 110 may also be used such that media content is presented to a user in a different manner. Examples of media content presented by the headset 110 include one or more images, video, audio, or some combination thereof. The headset 110 may include, among other components, a frame 705, a lens 710, a left speaker 720a, a right speaker 720b, a DCA 730, a PCA 795, an acoustic sensor 735, a position sensor 740, and a local controller 725. While FIG. 7 illustrates the components of the headset 110 in example locations on the headset 110, the components may be located elsewhere on the headset 110, on a peripheral device paired with the headset 110, or some combination thereof.

The headset 110 may correct or enhance the vision of a user, protect the eye of a user, or provide images to a user. The headset 110 may be eyeglasses which correct for defects in a user's eyesight. The headset 110 may be sunglasses which protect a user's eye from the sun. The headset 110 may be safety glasses which protect a user's eye from impact. The headset 110 may be a night vision device or infrared goggles to enhance a user's vision at night. The headset 110 may be a near-eye display that produces artificial reality content for the user. Alternatively, the headset 110 may not include a lens 710 and may be a frame 705 with an audio system that provides audio content (e.g., music, radio, podcasts) to a user.

The frame 705 holds the other components of the headset 110. A left audio channel generated by the audio processing system 130 may be provided to the left speaker 720a, and a right audio channel generated by the audio processing system 130 may be provided to the right speaker 720b.

The lens 710 provides or transmits light to a user wearing the headset 110. The lens 710 may be prescription lens (e.g., single vision, bifocal and trifocal, or progressive) to help correct for defects in a user's eyesight. The prescription lens transmits ambient light to the user wearing the headset 110. The transmitted ambient light may be altered by the prescription lens to correct for defects in the user's eyesight. The lens 710 may be a polarized lens or a tinted lens to protect the user's eyes from the sun. The lens 710 may be one or more waveguides as part of a waveguide display in which image light is coupled through an end or edge of the waveguide to the eye of the user. The lens 710 may include an electronic display for providing image light and may also include an optics block for magnifying image light from the electronic display.

The DCA 730 captures depth image data describing depth information for a local area surrounding the headset 110, such as a room. In some embodiments, the DCA 730 may include a light projector (e.g., structured light and/or flash illumination for time-of-flight), an imaging device, and a controller. The captured data may be images captured by the imaging device of light projected onto the local area by the light projector. In one embodiment, the DCA may include two or more cameras that are oriented to capture portions of the local area in stereo and a controller. The captured data may be images captured by the two or more cameras of the local area in stereo. The controller computes the depth information of the local area using the captured data and depth determination techniques (e.g., structured light, time-of-flight, stereo imaging, etc.). Based on the depth information, the controller 725 determines absolute positional information of the headset 110 within the local area. The controller 725 may also generate a model of the area, such as a room. The DCA 730 may be integrated with the headset 110 or may be positioned within the local area external to the headset 110. In the latter embodiment, the controller of the DCA 730 may transmit the depth image data to the controller 725 of the headset 110. In addition, the position sensor 740 generates one or more measurements signals in response to motion of the headset 110. The position sensor 740 may be located on a portion of the frame 705 of the headset 110.

The position sensor 740 may include a position sensor, an inertial measurement unit (IMU), or both. Some embodiments of the headset 110 may or may not include the position sensor 740 or may include more than one position sensors 740. In embodiments in which the position sensor 740 includes an IMU, the IMU generates IMU data based on measurement signals from the position sensor 740. Examples of position sensor 740 include: one or more accelerometers, one or more gyroscopes, one or more magnetometers, another suitable type of sensor that detects motion, a type of sensor used for error correction of the IMU, or some combination thereof. The position sensor 740 may be located external to the IMU, internal to the IMU, or some combination thereof.

Based on the one or more measurement signals, the position sensor 740 estimates a current position of the headset 110 relative to an initial position of the headset 110. The estimated position may include a location of the headset 110 and/or an orientation of the headset 110 or the user's head wearing the headset 110, or some combination thereof. The orientation may correspond to a position of each ear relative to a reference point. In some embodiments, the position sensor 740 uses the depth information and/or the absolute positional information from a DCA 730 to estimate the current position of the headset 110. The position sensor 740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 110 from the sampled data. For example, the IMU integrates the measurement signals received from the accelerometers over time to estimate a velocity vector and integrates the velocity vector over time to determine an estimated position of a reference point on the headset 110. The reference point is a point that may be used to describe the position of the headset 110. While the reference point may generally be defined as a point in space, however, in practice the reference point is defined as a point within the headset 110.

The PCA 795 includes one or more passive cameras that generate color (e.g., RGB) image data. Unlike the DCA 730 that uses active light emission and reflection, the PCA 795 captures light from the environment of a local area to generate image data. Rather than pixel values defining depth or distance from the imaging device, the pixel values of the image data may define the visible color of objects captured in the imaging data. In some embodiments, the controller 725 generates the image data based on light captured by the passive imaging device.

The acoustic sensor 735 records sounds, such as in connection with determination of measured room impulse responses or other measured acoustic parameters. In some embodiments, the acoustic sensor 734 may include a microphone array with multiple acoustic detection locations that are positioned on the headset 110.

Figure 8:
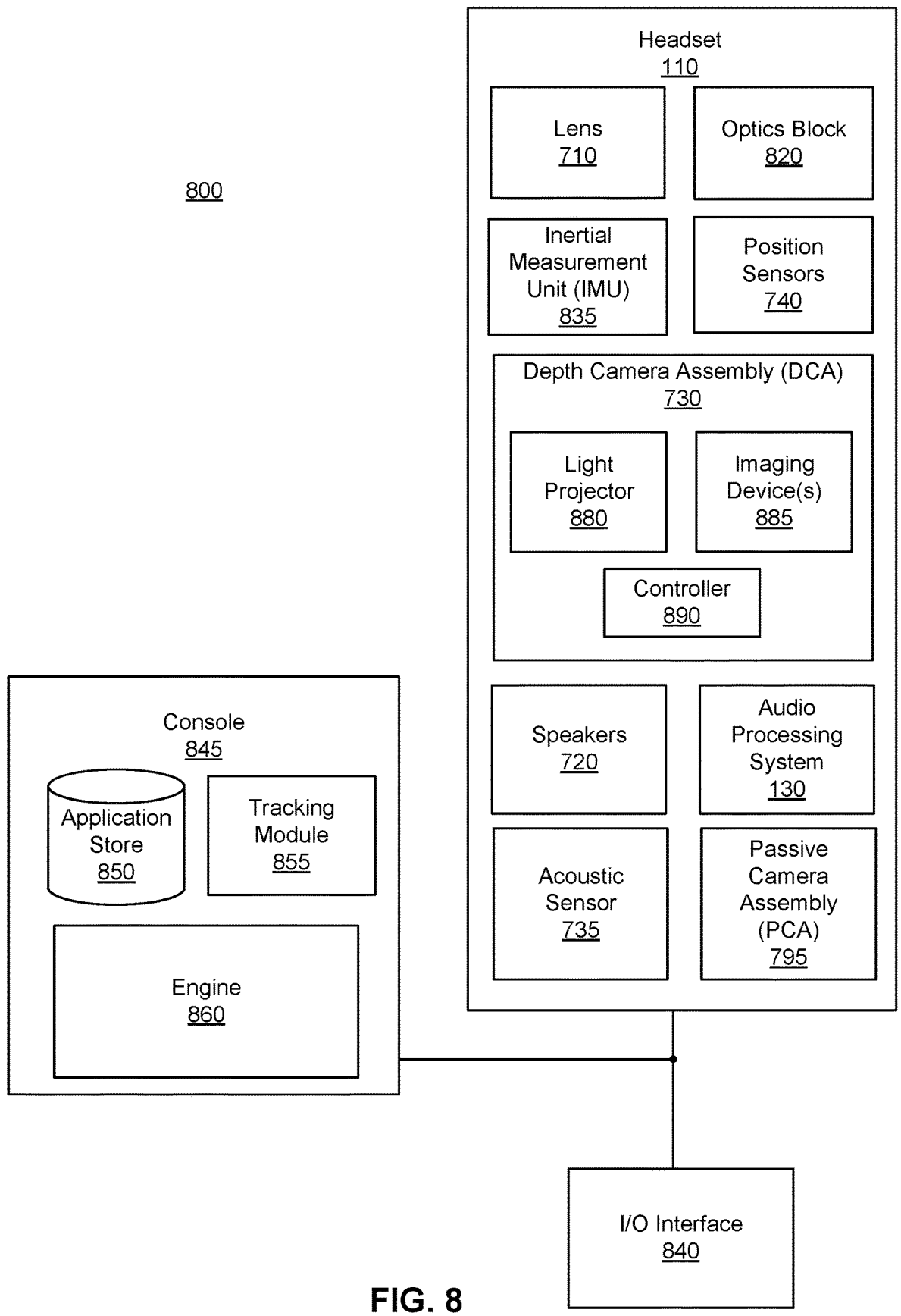
FIG. 8 is a block diagram of a system environment including a headset, according to some embodiments.

FIG. 8 is a block diagram of a system environment 800 including a headset 110, according to some embodiments. The system 800 may operate in a virtual reality (VR), an augmented reality (AR), a mixed reality (MR), or some combination thereof. The system 800 includes a headset 110 and an input/output (I/O) interface 840 that is coupled to a console 845. While FIG. 8 shows an example system 800 including one headset 110 and one I/O interface 840, in other embodiments any number of these components may be included in the system 800. For example, there may be multiple headsets 110 each having an associated I/O interface 840, with each headset 110 and I/O interface 840 communicating with the console 845. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 845 may be provided by the headset 110. In another example, some or all of the functionality of the headset 110 may be provided by the console 845.

The headset 110 includes a lens 710, an optics block 820, one or more position sensors 740, a depth camera assembly (DCA) 730, an inertial measurement unit (IMU) 835, a passive camera assembly (PCA) 795, the speakers 720, the audio processing system 170, and the acoustic sensor 735. Some embodiments of headset 110 have different components than those described in conjunction with FIG. 8. Additionally, the functionality provided by various components described in conjunction with FIG. 8 may be differently distributed among the components of the headset 110 in other embodiments, or be captured in separate assemblies remote from the headset 110.

The lens 610 may include an electronic display that displays 2D or 3D images to the user in accordance with data received from the console 845. In various embodiments, the lens 610 comprises a single electronic display or multiple electronic displays (e.g., a display for each eye of a user). Examples of an electronic display include: a liquid crystal display (LCD), an organic light emitting diode (OLED) display, an active-matrix organic light-emitting diode display (AMOLED), some other display, or some combination thereof.

The optics block 820 magnifies image light received from the electronic display, corrects optical errors associated with the image light, and presents the corrected image light to a user of the headset 110. In various embodiments, the optics block 820 includes one or more optical elements. Example optical elements included in the optics block 820 include: an aperture, a Fresnel lens, a convex lens, a concave lens, a filter, a reflecting surface, or any other suitable optical element that affects image light. Moreover, the optics block 820 may include combinations of different optical elements. In some embodiments, one or more of the optical elements in the optics block 820 may have one or more coatings, such as partially reflective or anti-reflective coatings.

Magnification and focusing of the image light by the optics block 820 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 820 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 820 corrects the distortion when it receives image light from the electronic display generated based on the content.

The IMU 835 is an electronic device that generates data indicating a position of the headset 110 based on measurement signals received from one or more of the position sensors 740. A position sensor 740 generates one or more measurement signals in response to motion of the headset 110. Examples of position sensors 740 include: one or more accelerometers, one or more gyroscopes, one or more magnetometers, another suitable type of sensor that detects motion, a type of sensor used for error correction of the IMU 835, or some combination thereof. The position sensors 740 may be located external to the IMU 835, internal to the IMU 835, or some combination thereof.

The DCA 730 generates depth image data of a local area, such as a room. Depth image data includes pixel values defining distance from the imaging device, and thus provides a (e.g., 3D) mapping of a locations captured in the depth image data. The DCA 730 includes a light projector 880, one or more imaging devices 885, and a controller 890. The light projector 880 may project a structured light pattern or other light that is reflected off objects in the local area, and captured by the imaging device 885 to generate the depth image data.

For example, the light projector 880 may project a plurality of structured light (SL) elements of different types (e.g. lines, grids, or dots) onto a portion of a local area surrounding the headset 110. In various embodiments, the light projector 880 comprises an emitter and a pattern plate. The emitter is configured to illuminate the pattern plate with light (e.g., infrared light). The illuminated pattern plate projects a SL pattern comprising a plurality of SL elements into the local area. For example, each of the SL elements projected by the illuminated pattern plate is a dot associated with a particular location on the pattern plate.

Each SL element projected by the DCA 730 comprises light in the infrared light part of the electromagnetic spectrum. In some embodiments, the illumination source is a laser configured to illuminate a pattern plate with infrared light such that it is invisible to a human. In some embodiments, the illumination source may be pulsed. In some embodiments, the illumination source may be visible and pulsed such that the light not visible to the eye.

The SL pattern projected into the local area by the DCA 730 deforms as it encounters various surfaces and objects in the local area. The one or more imaging devices 885 are each configured to capture one or more images of the local area. Each of the one or more images captured may include a plurality of SL elements (e.g., dots) projected by the light projector 880 and reflected by the objects in the local area. Each of the one or more imaging devices 885 may be a detector array, a camera, or a video camera.

The controller 890 generates the depth image data based on light captured by the imaging device 885. The controller 890 may further provide the depth image data to the console 845, or some other component.

The PCA 795 includes one or more passive cameras that generate color (e.g., RGB) image data. Unlike the DCA 730 that uses active light emission and reflection, the PCA 795 captures light from the environment of a local area to generate image data. Rather than pixel values defining depth or distance from the imaging device, the pixel values of the image data may define the visible color of objects captured in the imaging data. In some embodiments, the PCA 795 includes a controller that generates the image data based on light captured by the passive imaging device.

In some embodiments, the DCA 730 and the PCA 795 share a controller, such as the local controller 725 shown in FIG. 7. For example, the controller 725 may map each of the one or more images captured in the visible spectrum (e.g., image data) and in the infrared spectrum (e.g., depth image data) to each other. In one or more embodiments, the controller 725 is configured to, additionally or alternatively, provide the one or more images of the local area to the audio processing system 130 to generate the model of the room and determine the acoustic parameters of the room.

The audio processing system 130 determines the room impulse response or other acoustic parameters of a room, and adjusts audio signals associated with objects using the acoustic parameters. The output audio signal generated by the audio processing system 130 is provided to the speakers 720, including the left speaker 720a and right speaker 720b. Various components of the audio processing system 130 may be located in the headset 110 as shown in FIG. 7, or elsewhere such as in the console 845, or a remote system as shown in FIG. 1. In one example, image data capture and updating of the model is performed at the headset 110, the simulations using the model to determine acoustic parameters are performed in a remote system, and using the acoustic parameters to modify a source audio signal for an object is performed by the headset 110. In some embodiments, updating the model using the image data may also be performed by a remote system.

The acoustic sensor 735 may be used to receive audio inputs from the user of the headset, or to measure room impulse responses. In some embodiments, a speaker 720 generates sound using a reference audio signal to facilitate determination of a measured room impulse response or other measured acoustic parameters by another headset 110 or other device. In some embodiments, the acoustic sensor 735 includes a microphone array to facilitate direction of arrival estimation for received audio signals.

The I/O interface 840 is a device that allows a user to send action requests and receive responses from the console 845. An action request is a request to perform a particular action. For example, an action request may be an instruction to start or end capture of image or video data, or an instruction to perform a particular action within an application. The I/O interface 840 may include one or more input devices. Example input devices include: a keyboard, a mouse, a game controller, or any other suitable device for receiving action requests and communicating the action requests to the console 845. An action request received by the I/O interface 840 is communicated to the console 845, which performs an action corresponding to the action request. In some embodiments, the I/O interface 840 includes the IMU 835, as further described above, that captures calibration data indicating an estimated position of the I/O interface 840 relative to an initial position of the I/O interface 840. In some embodiments, the I/O interface 840 may provide haptic feedback to the user in accordance with instructions received from the console 845. For example, haptic feedback is provided when an action request is received, or the console 845 communicates instructions to the I/O interface 840 causing the I/O interface 840 to generate haptic feedback when the console 845 performs an action.

The console 845 provides content to the headset 110 for processing in accordance with information received from one or more of: the DCA 730, the PCA 795, the headset 110, and the I/O interface 840. In the example shown in FIG. 8, the console 845 includes an application store 850, a tracking module 855, and an engine 860. Some embodiments of the console 845 have different modules or components than those described in conjunction with FIG. 8. Similarly, the functions further described below may be distributed among components of the console 845 in a different manner than described in conjunction with FIG. 8. In some embodiments, the functionality discussed herein with respect to the console 845 may be implemented in the headset 110, or a remote system.

The application store 850 stores one or more applications for execution by the console 845. An application is a group of instructions, that when executed by a processor, generates content for presentation to the user. Content generated by an application may be in response to inputs received from the user via movement of the headset 110 or the I/O interface 840. Examples of applications include: gaming applications, conferencing applications, video playback applications, or other suitable applications.

The tracking module 855 calibrates the local area of the system 800 using one or more calibration parameters and may adjust one or more calibration parameters to reduce error in determination of the position of the headset 110 or of the I/O interface 840. For example, the tracking module 855 communicates a calibration parameter to the DCA 630 to adjust the focus of the DCA 630 to more accurately determine positions of SL elements captured by the DCA 630. Calibration performed by the tracking module 855 also accounts for information received from the IMU 835 in the headset 110 and/or an IMU 835 included in the I/O interface 840. Additionally, if tracking of the headset 110 is lost (e.g., the DCA 630 loses line of sight of at least a threshold number of the projected SL elements), the tracking module 855 may re-calibrate some or all of the system 800.

The tracking module 855 tracks movements of the headset 110 or of the I/O interface 840 using information from the DCA 730, the PCA 795, the one or more position sensors 740, the IMU 835 or some combination thereof. For example, the tracking module 855 determines a position of a reference point of the headset 110 in a mapping of a local area based on information from the headset 110. The tracking module 855 may also determine positions of an object or virtual object. Additionally, in some embodiments, the tracking module 855 may use portions of data indicating a position or the headset 110 from the IMU 835 as well as representations of the local area from the DCA 730 to predict a future location of the headset 110. The tracking module 855 provides the estimated or predicted future position of the headset 110 or the I/O interface 840 to the engine 860.

The engine 860 executes applications and receives position information, acceleration information, velocity information, predicted future positions, or some combination thereof, of the headset 110 from the tracking module 855. Based on the received information, the engine 860 determines content to provide to the headset 110 for presentation to the user. For example, if the received information indicates that the user has looked to the left, the engine 860 generates content for the headset 110 that mirrors the user's movement in a virtual local area or in a local area augmenting the local area with additional content. Additionally, the engine 860 performs an action within an application executing on the console 845 in response to an action request received from the I/O interface 840 and provides feedback to the user that the action was performed. The provided feedback may be visual or audible feedback via the headset 110 or haptic feedback via the I/O interface 840. In some embodiments, the engine 860 includes the room modeling module 210 that updates the model of the room, or other components of the audio processing system 130.

Figure 9:
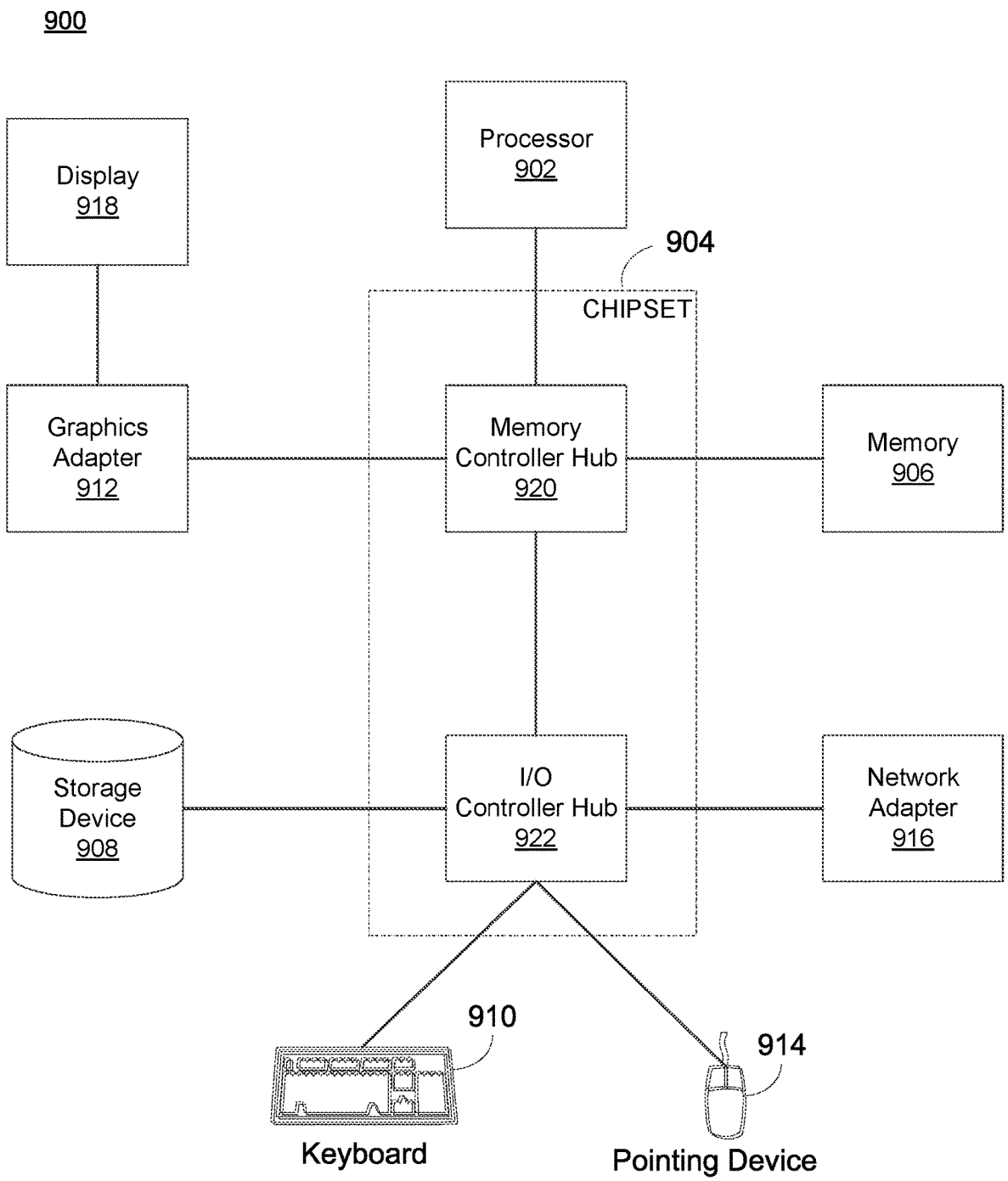
FIG. 9 is a high-level block diagram illustrating physical components of a computer, according to some embodiments.

FIG. 9 is a high-level block diagram illustrating physical components of a computer 900, according to some embodiments. The computing components discussed herein such as the audio processing system 130, the headset 110, or the console 845 may be implemented on the computer 900. Illustrated are at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display device 918 is coupled to the graphics adapter 912. A storage device 908, keyboard 910, pointing device 914, and network adapter 916 are coupled to the I/O controller hub 922. Other embodiments of the computer 900 have different architectures. For example, the memory 906 is directly coupled to the processor 902 in some embodiments.

The storage device 908 includes one or more non-transitory computer-readable storage media such as a hard drive, compact disk read-only memory (CD-ROM), DVD, or a solid-state memory device. The memory 906 holds instructions and data used by the processor 902. For example, the memory 906 may store instructions that when executed by the processor 902 causes or configures the processor 902 to perform the methods discussed herein, such as the methods 400, 500, or 600. The pointing device 914 is used in combination with the keyboard 910 to input data into the computer system 900. The graphics adapter 912 displays images and other information on the display device 918. In some embodiments, the display device 918 includes a touch screen capability for receiving user input and selections. The network adapter 916 couples the computer system 900 to a network. Some embodiments of the computer 900 have different and/or other components than those shown in FIG. 9. For example, the computer system 900 may be a server that lacks a display device, keyboard, and other components.

The computer 900 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 908, loaded into the memory 906, and executed by the processor 902.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method, comprising, by a processing circuitry of a headset:
   obtaining a model of a room determined based on image data including depth image data from a depth camera assembly and color image data from a color camera, the model including surfaces of the room and acoustic absorptions of the surfaces;
   adjusting audio content presented by the headset based on a room impulse response, the room impulse response determined based on one or more simulations of sound propagation between a target position of an object and a position of the headset within the room using the surfaces of the room and the acoustic absorptions of the surfaces, wherein the one or more simulations include a first simulation of a sound traveling from the target position to a surface in the model, the sound being reflected by the surface resulting in attenuation of the sound based on an acoustic absorption of the surface in the model, and the sound traveling from the surface to the position of the headset;
   determining a direct sound component and an early reflection component of the room impulse response by performing the first simulation of the one or more simulations, and wherein adjusting the audio content based on the room impulse response includes adjusting a first portion of the audio content using the direct sound component and the early reflection component;
   receiving a late reverberation component of the room impulse response from a server, the late reverberation component being determined by the server performing a second simulation of the one or more simulations; and
   determining a combined room impulse response by combining the direct sound component, early reflection component, and late reverberation component, wherein adjusting the audio content based on the room impulse response includes adjusting a second portion of the audio content using the combined room impulse response.

2. The method of claim 1, wherein the acoustic absorption of the surface is determined by application of the image data to a neural network model defining relationships between acoustic absorptions and appearances of surfaces in the image data.

3. The method of claim 2, further comprising, by the processing circuitry:
   receiving a sound generated from an audio signal by an audio source;
   determining a transfer function between the sound and the audio signal;
   determining an acoustic parameter based on the transfer function, the acoustic parameter including at least one of a measured room impulse response, a measured reverberation time, and a measured direct to reverberation ratio; and
   updating the relationships between the acoustic absorptions and the appearances of surfaces of the neural network model based on the acoustic parameter.

4. The method of claim 1, further comprising, by the processing circuitry:
   determining a measured room impulse response for a source location in the room; and
   updating the acoustic absorption of the surface in the model based on the measured room impulse response.

5. The method of claim 1, further comprising, by the processing circuitry:
   determining a plurality of measured room impulse responses for a plurality of source locations in the room; and
   determining the room impulse response based in part on the plurality of measured room impulse responses.

6. The method of claim 1, wherein the depth camera assembly and the color camera are located on the headset.

7. The method of claim 1, further including providing the image data to the server, and wherein obtaining the model of the room based on the image data includes receiving the model from the server.

8. A headset comprising:
   a processing circuitry configured to:
      obtain a model of a room determined based on image data including depth image data from a depth camera assembly and color image data from a color camera, the model including surfaces of the room and acoustic absorptions of the surfaces;
      adjust audio content presented by the headset based on a room impulse response, the room impulse response determined based on one or more simulations of sound propagation between a target position of an object and a position of the headset within the room using the surfaces of the room and the acoustic absorptions of the surfaces, wherein the one or more simulations include a first simulation of a sound traveling from the target position to a surface in the model, the sound being reflected by the surface resulting in attenuation of the sound based on an acoustic absorption of the surface in the model, and the sound traveling from the surface to the position of the headset;
      determine a direct sound component and an early reflection component of the room impulse response by performing the first simulation of the one or more simulations, and wherein the processing circuitry configured to adjust the audio content based on the room impulse response includes the processing circuitry being configured to adjust a first portion of the audio content using the direct sound component and the early reflection component;
      receive a late reverberation component of the room impulse response from a server, the late reverberation component being determined by the server performing a second simulation of the one or more simulations; and
      determine a combined room impulse response by combining the direct sound component, early reflection component, and late reverberation component, wherein the processing circuitry configured to adjust the audio content based on the room impulse response includes the processing circuitry being configured to adjust a second portion of the audio content using the combined room impulse response.

9. The headset of claim 8, wherein the acoustic absorption of the surface is determined by application of the image data to a neural network model defining relationships between acoustic absorptions and appearances of surfaces in the image data.

10. The headset of claim 9, wherein the processing circuitry is further configured to:
   receive a sound generated from an audio signal by an audio source;

determine a transfer function between the sound and the audio signal defining a reverberation time;

determine an acoustic parameter based on the transfer function, the acoustic parameter including at least one of a measured room impulse response, a measured reverberation time, and a measured direct to reverberation ratio; and update the relationships between the acoustic absorptions and the appearances of surfaces of the neural network model based on the acoustic parameter.

11. The headset of claim 8, wherein:

the processing circuitry is further configured to provide the image data to the server, and the processing circuitry configured to obtain the model of the room based on the image data includes the processing circuitry being configured to receive the model from the server.

12. A system comprising:

a headset including processing circuitry configured to:
  obtain a model of a room determined based on image data including depth image data from a depth camera assembly and color image data from a color camera, the model including surfaces of the room and acoustic absorptions of the surfaces;
  adjust audio content presented by the headset based on a room impulse response, the room impulse response determined based on one or more simulations of sound propagation between a target position of an object and a position of the headset within the room using the surfaces of the room and the acoustic absorptions of the surfaces, wherein the one or more simulations include a first simulation of a sound traveling from the target position to a surface in the model, the sound being reflected by the surface resulting in attenuation of the sound based on an acoustic absorption of the surface in the model, and the sound traveling from the surface to the position of the headset;
  determine a direct sound component and an early reflection component of the room impulse response by performing the first simulation of the one or more simulations, and wherein the processing circuitry configured to adjust the audio content based on the room impulse response includes the processing circuitry being configured to adjust a first portion of the audio content using the direct sound component and the early reflection component;
  receive a late reverberation component of the room impulse response from a server; and
  determine a combined room impulse response by combining the direct sound component, early reflection component, and late reverberation component, wherein the processing circuitry configured to adjust the audio content based on the room impulse response includes the processing circuitry being configured to adjust a second portion of the audio content using the combined room impulse response; and the server configured to:
  receive the image data from the headset;
  update the model based on the image data;
  provide the model to the headset; and
  determine the late reverberation component of the room impulse response by performing a second simulation of the one or more simulations.

* * * * *